March 5, 1968  C. C. EHINGER  3,371,691

ADAPTOR FOR POWERED ROTARY HAND SAWS

Filed Oct. 23, 1965

INVENTOR
Calvin C. Ehinger;
BY R. S. Berry
ATTORNEY

United States Patent Office 3,371,691
Patented Mar. 5, 1968

3,371,691
ADAPTOR FOR POWERED ROTARY HAND SAWS
Calvin C. Ehinger, 16123 Grevillea,
Lawndale, Calif. 90260
Filed Oct. 23, 1965, Ser. No. 503,819
2 Claims. (Cl. 143—155)

ABSTRACT OF THE DISCLOSURE

The invention relates to an attachment for powered rotary hand saws of the type embodying a driven rotary shaft having on its outer end a circular saw blade; said attachment being adapted to be interposed between the outer end of the shaft and the saw blade for the purpose of positioning the blade beyond a guard with which the saw is equipped whereby the blade may be positioned flat-wise close to a wall surface in parallel relation thereto and at right angles relative to the rotary shaft, the invention residing in an attachment which is so constructed that it may be applied to the outer blade carrying butt end of the conventional drive shaft of a well-known type of hand saw in place of the saw blade usually mounted thereon and then afford a supplemental mounting for the blade in outward relation to the blade guard.

---

This invention relates to powered rotary hand saws and particularly pertains to and has as its primary object the provision of an adaptor attachment to said saws whereby the rotary saw blade may be positioned beyond a fixed guard rail with which the saw is equipped, so that the blade may be presented close to a wall surface in parallel relation thereto.

Another object is to provide an adaptor of the above character which may be readily applied to and removed from the conventional skill saw.

The invention is illustrated in the accompanying drawing, in which.

Figure 1:
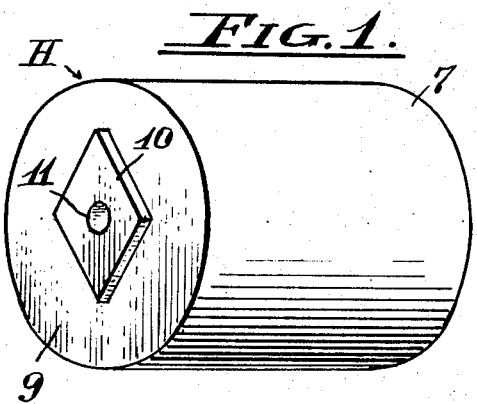
FIG. 1 is an isometric view of the adaptor as seen from the front end thereof.

Referring to the drawing more specifically A indicates generally a conventional power driven hand saw embodying a powered rotary shaft B the outer end of which is designed to demountably receive a circular saw blade C; the shaft B having a flat outer end from which projects a contoured lug D having a diamond shaped outline, which lug is engageable in a correspondingly shaped aperture E centrally of the blade C.

Ordinarily the blade C is held in place on the outer end of the shaft by a short bolt (not shown) the head of which engages a washer seated on the outer face of the saw blade with the threaded shank of the bolt screwed into an internally threaded axial bore F in the outer end of the shaft.

The saw A is characterized by having a fixed guard rail G which ordinarily extends in front of the blade C when the latter is mounted on the outer end of the shaft B.

Figure 2:
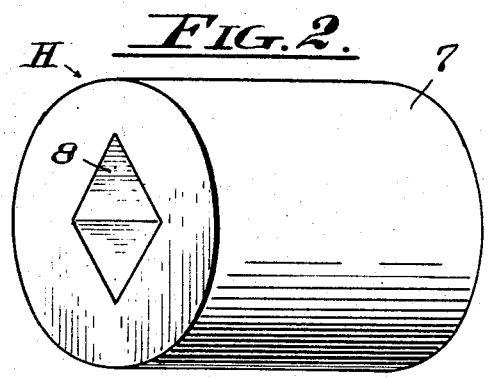
FIG. 2 is an isometric view of the adaptor as seen from its rear end.
Figure 3:
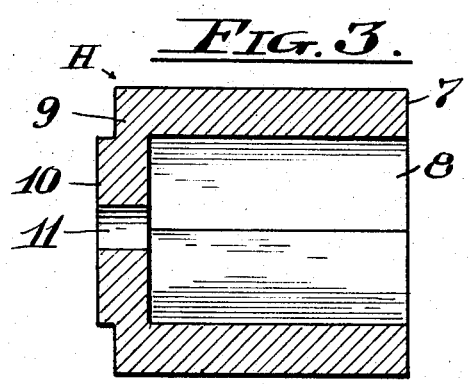
FIG. 3 is a view of the adaptor in longitudinal section.
Figure 4:
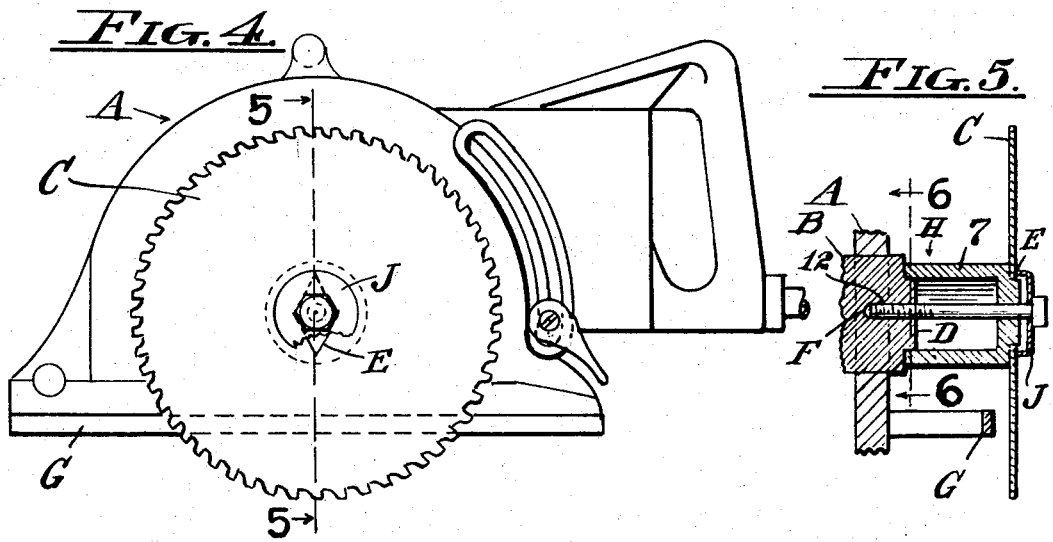
FIG. 4 is a view in front elevation of a power driven rotary hand saw showing the adaptor as applied.

The purpose of the present invention is to provide a means whereby the blade C may be positioned outside of the rail G and yet be impelled by the shaft B. This means comprises an adaptor H particularly shown in FIGS. 1–3 and embodying a tubular cylinder 7 having an opening 8 in the inner end thereof the margin of which is of diamond shaped outline and conformable to the margin of the lug D on the end of the shaft B, and having a wall 9 on its outer end from which projects centrally thereof a diamond shaped lug 10 conformable to the opening E in the saw blade which is mountable on the outer end wall 9 of the adaptor. An aperture 11 is provided in the wall 9 for the reception of an elongate bolt 12 the head of which engages a washer J imposed on the saw C, the bolt shank extending longitudinally and axially through the adaptor 7 and screwed into the bore F in the shaft to thereby assemble the saw blade and adaptor on the outer end of the shaft B as shown in FIG. 5.

Figure 5:
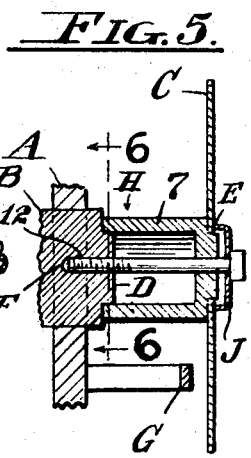
FIG. 5 is an enlarged detail in section as seen on the line 5—5 of FIG. 4.
Figure 6:
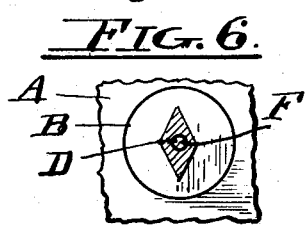
FIG. 6 is a detail in section and elevation taken on the line 6—6 of FIG. 5 as seen in the direction indicated by the arrows.

The adaptor is of such length that when applied as shown in FIG. 5, the saw blade C will be disposed outside the guard-rail G whereby the blade may be positioned close to a wall in parallel relation thereto, thereby enabling the employment of the powered hand saw in severing a projection on a wall close to the wall surface, which is impossible of performance with the type of saw herein set forth.

I claim:

1. An adaptor attachment for powered rotary hand saws of the type embodying a driven rotary shaft having a contoured saw-blade receiving lug on its outer end and a threaded axial bore opening through said lug, comprising a tubular cylinder having an opening in its inner end the margin of which is conformable to the margin of said lug, and having an end wall on its outer end, a saw-blade receiving lug projecting from said end wall corresponding in contour to that of the lug on said shaft; said end wall having a central bolt receiving aperture, and a bolt extending through said aperture and leading axially through said cylinder and having its inner end screwed into engagement with said threaded axial bore.

2. The combination with a powered rotary hand saw embodying a rotary shaft having an outer end with a contoured lug projecting therefrom formed with an open ended threaded axial bore, of a tubular body abutting the outer end of said shaft having an opening in one end thereof the margin of which conforms to the margin of said contoured lug, an end wall on the other end of said body, a contoured lug on said end wall corresponding to the lug on said shaft having an internally threaded bolt receiving aperture centrally thereof, a circular saw blade having a central aperture into which the lug on said tubular body extends, and a bolt detachably connecting said saw-blade and tubular body to the threaded axial bore of said rotary shaft.

References Cited

UNITED STATES PATENTS

| 1,883,392 | 10/1932 | Moll. | |
| 2,751,942 | 6/1956 | Emmons et al. | 143—155 |
| 2,782,813 | 2/1957 | Dudek | 143—155 X |
| 3,056,439 | 10/1962 | Hall et al. | |

DONALD R. SCHRAN, *Primary Examiner.*